United States Patent
Araya

(10) Patent No.: US 6,258,768 B1
(45) Date of Patent: Jul. 10, 2001

(54) ZEOLITE P ALUMINOSILICATES AND THEIR MANUFACTURE AND USE IN DETERGENT COMPOSITIONS

(75) Inventor: Abraham Araya, Merseyside (GB)

(73) Assignee: Imperial Chemical Industries PLC, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,169

(22) PCT Filed: Jul. 17, 1996

(86) PCT No.: PCT/EP96/03190

§ 371 Date: Aug. 20, 1998

§ 102(e) Date: Aug. 20, 1998

(87) PCT Pub. No.: WO97/06102

PCT Pub. Date: Feb. 20, 1997

(30) Foreign Application Priority Data

Apr. 8, 1995 (EP) .................................. 95305455

(51) Int. Cl.⁷ ........................... C01B 39/02; C01B 33/26
(52) U.S. Cl. .......................... 510/315; 510/322; 510/377; 510/507; 510/532; 510/466; 423/328.1; 423/700; 423/709; 423/712
(58) Field of Search .................................. 423/700, 712, 423/709, 328.1; 510/507, 532, 315, 322, 377, 466

(56) References Cited

U.S. PATENT DOCUMENTS

| | | | |
|---|---|---|---|
| 3,008,803 | * 11/1961 | Milton | 423/718 |
| 3,112,176 | 11/1963 | Haden et al. | |
| 3,532,459 | 10/1970 | McEvoy et al. | |
| 3,808,326 | 4/1974 | McDaniel | 423/329 |
| 4,591,491 | * 5/1986 | Christophliemk et al. | 423/329 |
| 5,362,466 | * 11/1994 | Araya | 423/328.1 |
| 5,374,370 | * 12/1994 | Brown et al. | 510/220 |
| 5,512,266 | * 4/1996 | Brown et al. | 423/700 |
| 5,560,829 | * 10/1996 | Adams et al. | 210/687 |
| 5,772,979 | * 6/1998 | Araya | 423/700 |

FOREIGN PATENT DOCUMENTS

| | | |
|---|---|---|
| 26 20 293 | 11/1977 | (DE) . |
| 0110650 | 6/1984 | (EP) . |
| 0202797 | 11/1986 | (EP) . |
| 0 384 070 | 8/1990 | (EP) . |
| 0 565 364 | 10/1993 | (EP) . |
| 2132597 | 7/1984 | (GB) . |
| 93/08124 | 4/1993 | (WO) . |
| WO 95 12546 | 5/1995 | (WO) . |
| 95/21125 | * 8/1995 | (WO) . |
| 97/03020 | 7/1996 | (WO) . |
| 97/00320 | 1/1997 | (WO) . |

* cited by examiner

Primary Examiner—C. H. Kelly
Assistant Examiner—Dawn L. Garrett
(74) Attorney, Agent, or Firm—Pillsbury Winthrop LLP

(57) ABSTRACT

P-type zeolite having the oxide formula $M_{2/n}Al_2O_3$ (1.8–2.66) SiO2 y H2O and having a Calcium Binding Capacity of between 100 and 145 mg/g, preferably between 110 and 140 and a Calcium uptake rate of between 12 and 100 seconds, preferably below 50 seconds can be prepared from metakaolin.

12 Claims, No Drawings

ZEOLITE P ALUMINOSILICATES AND THEIR MANUFACTURE AND USE IN DETERGENT COMPOSITIONS

FIELD OF THE INVENTION

The invention relates to crystalline aluminosilicates having the P-structure and to a process for manufacturing the same. These materials are of value as a component in detergent formulations in which they remove calcium and magnesium hardness ions by ion exchange. They also have other properties which provide additional benefits when used in detergent formulations. These aluminosilicates will be referred to as zeolite P in this description.

BACKGROUND OF THE INVENTION

While the utility of zeolite P in detergent formulations has been acknowledged, for example in European Patent Application 0384070 (Unilever), they must be manufactured by a commercially effective process in order to become available on the market place. Thus, while the properties of a material may make it a useful commercial commodity, its manufacture has to be optimised for large scale production.

The zeolite P class includes a series of synthetic zeolite phases which may be in cubic configuration (also termed B or $P_c$) or tetragonal configuration (also termed $P_1$) but is not limited to these forms. The structure and characteristics of the zeolite P class are given in "Zeolite Molecular Sieves" of Donald W Breck (published 1974 and 1984 by Robert E Krieger of Florida USA). The zeolite P class has the typical oxide formula:

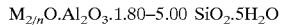
$M_{2/n}O.Al_2O_3.1.80-5.00\ SiO_2.5H_2O$

M is an n-valent cation which for this invention is an alkali-metal, that is lithium, potassium, sodium, caesium or rubidium with sodium and potassium being preferred and sodium being the cation normally used in commercial processes.

Thus sodium may be present as the major cation with another alkali metal present in a minor proportion to provide a specific benefit.

In EP-A-565,364 is described a process for preparing P zeolites in which aluminate and silicate solutions are reacted in presence of P zeolite seeds. During the formation of the crystalline zeolite the reacted medium passes through a gel stage. This process enables the production of high quality detergent zeolites having a Calcium Effective Binding Capacity (CEBC) of above 146 mg/g, with outstanding Calcium Uptake Rate (CUR) and high oil absorption.

In some applications it can be considered to use detergent zeolites with lower detergent characteristics but high oil absorption.

In U.S. Pat. No. 3,112,176 is described a process in which P type zeolites are produced from metakaolin. Having reproduced the examples disclosed in this document, a maximum Calcium Effective Binding Capacity of 90 mg/g has been obtained. Moreover, the kinetics characteristics of these zeolites were found to be very poor with a Calcium Uptake Rate of above 500 seconds.

In U.S. Pat. No. 3,008,803 is described a process in which aluminium hydroxide, silicic acid and water are mixed in a vessel and allowed to react at 100° C. for 48 hours with stirring. The agitation is stopped and the mixture is maintained at 100° C. for an additional 71 hours. A P-type zeolite with a CEBC of 65 mg/g and a CUR of above 500 seconds was obtained.

Now, to be used in detergents applications, a zeolite must exhibit, on top of a good CEBC (at least 100 mg/g), a Calcium Uptake Rate of less than 100 seconds. Therefore the zeolites P disclosed in U.S. Pat. No. 3,112,176 and U.S. Pat. No. 3,008,803 are not suitable for detergent applications.

There is therefore a need for a P-type zeolite with good detergents characteristics (i.e CEBC above 100 mg/g and CUR below 100 seconds) intermediate between those disclosed in U.S. Pat. No. 3,112,176 on the one hand and those disclosed in EP0384070 on the other hand. For the time being, it has not been possible to obtain such a P-type zeolite.

It has now been discovered that it is possible to obtain such an intermediate zeolite.

GENERAL DESCRIPTION OF THE INVENTION

It is a first object of the present invention to provide a P-type zeolite having the oxide formula:

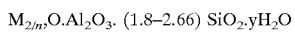
$M_{2/n}O.Al_2O_3.\ (1.8-2.66)\ SiO_2.yH_2O$ wherein y is the number of moles of water per mole of $Al_2O_3$, having a Calcium Effective Binding Capacity of between 100 and 145 mg/g, preferably between 110 and 140, most preferably between 110 and 130 mg/g and a Calcium uptake rate of between 12 and 100 seconds, preferably below 50 seconds.

Preferably, the P-type zeolite has an Average Particle Size of between 1 and 10 μm, more preferably between 3 μm and 6 μm.

It is a second object of the present invention to provide a process for manufacturing a P-type zeolite wherein metakaolin is allowed to react with a caustic solution in presence of P-type seeds.

The sources of the seed zeolite P is not critical, although preferably it is added to the reactants as a previously prepared slurry. Alternatively a crystallised slurry from a previous reaction may be used. Additionally the ratio of the P-zeolite seed is not critical and a P-zeolite having a Si:Al ratio above 1.33 can be used.

Preferably a caustic solution is first added into a reactor tank to form a caustic pool, metakaolin being then added to the caustic pool. The caustic pool is heated up to a temperature between 80° C. and 100° C., preferably above 90° C., before adding the metakaolin. More preferably metakaolin is added to the caustic pool in a slurry form.

The metakaolin can have a $SiO_2/Al_2O_3$ molar ratio of 2 to 2.5, typically ratios of 2.15 to 2.2 are easily commercially available.

The zeolite P seeds are added to the caustic pool 5 to 20 minutes after the addition of metakaolin preferably they are added to the caustic pool 10 to 15 minutes after the addition of metakaolin.

It is a third object of the present invention to provide a detergent composition comprising 0.5% to 60% by weight of a surfactant system, 20% to 80% by weight of a detergency builder system, and optionally other conventional components; the detergency builder system comprising, in an amount of 5% to 80% by weight of the detergent composition, an alkali metal aluminosilicate of the zeolite P type having a silicon to aluminium ratio not greater than 1.33, the aluminosilicate having a Calcium Effective Binding Capacity of between 100 and 145 mg CaO per g of anhydrous aluminosilicate, preferably between 110 and 140 and a Calcium uptake rate of between 12 and 100 seconds, preferably below 50 seconds.

Standard Procedures

In the characterisation of the zeolite-P materials prepared by the present process the following methods were used.

i. Particle size: The average particle size (microns) was measured by a Malvern Mastersizer (Trade Mark) obtainable from Malvern Instruments, England and expressed as the $d_{50}$, i.e. 50% by weight of the particles have a diameter smaller than the diameter quoted. The definitions $d_{80}$ and $d_{90}$ may also be used in association with the appropriate figure. Prior to measuring the particle size, the sample is dried as a thin layer (about 1.5 mm) at 110° C. for two hours in a fan oven.

ii. Calcium uptake rate (CUR): The rate of removal of $Ca^{++}$ ions from a wash liquor is an important characteristic of a detergency builder. The time, in seconds, is determined for a zeolite, at a concentration of 1.48 $gdm^{-3}$ and a temperature of 25° C., to reduce the calcium ion concentration in a 0.01M sodium chloride solution from an initial value of $2 \times 10^{-3}$ M to $10^{-5}$ M. The zeolite was first equilibrated to constant weight over saturated sodium chloride solution and the water content measured.

iii. Calcium effective binding capacity (CEBC): The CEBC was measured in the presence of a background electrolyte to provide a realistic indicator of calcium ion uptake in a wash liquor environment. A sample of each zeolite was first equilibrated to constant weight over saturated sodium chloride solution and the water content measured. Each equilibrated sample was dispersed in water (1 $cm^3$) in an amount corresponding to 1 g $dm^{-3}$ (dry), and the resulting dispersion (1 $cm^3$) was injected into a stirred solution, consisting of 0.01M NaCl solution (50 $cm^3$) and 0.05M $CaCl_2$ (3.923 $cm^3$), therefore producing a solution of total volume 54.923 $cm^3$. This corresponded to a concentration of 200 mg CaO per liter, i.e. just greater than the theoretical maximum amount (197 mg) that can be taken up by a zeolite of Si:Al ratio 1.00. The change in $Ca^{2+}$ ion concentration was measured by using a $Ca^{2+}$ ion selective electrode, the final reading being taken after 15 minutes. The temperature was maintained at 25° C. throughout. The $Ca^{2+}$ ion concentration measured was subtracted from the initial concentration, to give the effective calcium binding capacity of the zeolite sample as mg CaO/g zeolite.

iv. Oil absorption: This was determined by the ASTM spatula rub-out method (American of Test Material Standards D281). The test is based on the principle of mixing linseed oil with the particulate zeolite by rubbing with a spatula on a smooth surface until a stiff putty like paste is formed which will not break or separate when it is cut with the spatula. The weight of oil used is then put into the equation:

$$\text{Oil absorption } (OA) = \frac{\text{g oil absorbed} \times 100}{\text{wt. of zeolite (gms)}}$$

$$= \text{g oil}/100 \text{ g zeolite}$$

In order to measure the oil absorption of the product, the washed filter cakes obtained after crystallisation were merely dried at room temperature as a thin layer of about 2 mm until a solids content of at least 78% by weight was achieved, normally it was achieved in 2–3 days.

v. The form of the zeolite which was produced was established using standard XRD method.

Specific Description of the Invention

Examples of processes of the invention will now be given to illustrate but not limit the invention.

EXAMPLE 1

2037 g of a 9.2% caustic solution was placed in a baffled 5 liter flask. The caustic solution was stirred and the temperature raised to 100° C. To the stirred solution, 186.5 g of metakaolin having a $SiO_2/Al_2O_3$ ratio of 2.18 (obtainable from English China Clay), slurried in 400 g of water, was added. The temperature and stirring was maintained for 5 hours, after which the product was filtered, washed and dried.

EXAMPLE 2

Example 1 was reproduced except that 20 g of P-type zeolite slurried in 30 g of water was added 15 minutes after the addition of the metakaolin/water slurry.

EXAMPLE 3

The procedure of Example 1 was repeated, except that 1930 g of 14.5% caustic solution and 300 g of metakaolin slurried in 600 g of water were used.

EXAMPLE 4

Example 3 was reproduced except that 20 g of P-type zeolite slurried in 30 g of water was added 15 minutes after the addition of the metakaolin/water slurry.

EXAMPLE 5

The procedure of Example 1 was repeated, except that 1800 g of 19.3% caustic solution and 400 g of metakaolin slurried in 800 g of water were used.

EXAMPLE 6

Example 5 was reproduced except that 20 g of P-type zeolite slurried in 30 g of water was added 15 minutes after the addition of the metakaolin/water slurry.

The products obtained in Examples 1 to 6 were analyzed and the results are summarized in the following table.

|  | Ex. 1 | Ex. 2 | Ex. 3 | Ex. 4 | Ex. 5 | Ex. 6 |
| --- | --- | --- | --- | --- | --- | --- |
| XRD (zeolite type) | P + trace A | P | P + A | P | A | p |
| APS (μm) | 5 | 4.6 | 6.5 | 4.4 | 9.0 | 4.1 |
| CUR (seconds) | 255 | 62 | 212 | 27 | 150 | 25 |
| CEBC (mg/g) | 110 | 130 | 105 | 140 | 110 | 145 |
| Oil absorption capacity (g/100 g) | 85 | 87 | 82 | 92 | 78 | 100 |

What is claimed is:

1. P-type zeolite having the oxide formula:

$M_{2/n}O.Al_2O_3 . (1.8-2.66) SiO_2.yH_2O$ having a Calcium Effective Binding Capacity of between 100 and 145 mg/g and a Calcium uptake rate of between 12 and 100 seconds and wherein y is the number of moles of water per mole of $Al_2O_3$ and M is an n-valent cation.

2. P-type zeolite according to claim 1 having an Average Particle Size of between 1 and 10 μm.

3. Process for manufacturing a P-type zeolite wherein a caustic solution is first added into a reactor tank to form a caustic pool, metakaolin is then added to said caustic pool and allowed to react with the caustic solution in the presence of P-type zeolite seeds, said P-type zeolite seeds being added manufactured thereby has a Calcium uptake rate of between 12 and 100 seconds and has the oxide formula:

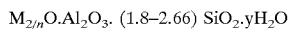

wherein y is the number of moles of water per mole of $Al_2O_3$ and M is an n-valent cation.

4. Process according to claim 3 wherein the caustic pool is heated up to a temperature between 80° and 100° C. before adding the metakaolin.

5. Process according to claim 3 wherein metakaolin is added to the caustic pool in a slurry form.

6. Process according to claim 3 wherein the P-type zeolite seeds are added to the caustic pool 10 to 15 minutes after addition of metakaolin.

7. Detergent composition comprising 0.5% to 60% by weight of a surfactant system, 20% to 80% by weight of a detergency builder system; the detergency builder system comprising, in an amount of 5% to 80% by weight of the detergent composition, an alkali metal aluminosilicate of the zeolite P type having a silicon to aluminum ratio not greater than 1.33, the aluminosilicate having a Calcium Effective Binding Capacity of between 100 and 145 mg CaO per g of anhydrous aluminosilicate, as measured at 25° C. and a Calcium uptake rate of between 12 and 100 seconds.

8. P-type zeolite according to claim 1 having a Calcium Effective Binding Capacity, as measured at 25° C. of between 110 and 130 mg/g.

9. P-type zeolite according to claim 1 having a Calcium uptake rate between 12 and 50 seconds.

10. Process according to claim 3 wherein the P-type zeolite manufactured thereby has a Calcium Effective Binding Capacity, as measured at 25° C. of between 100 and 145 mg/g.

11. P-type zeolite according to claim 1 wherein the n-valent cation is an alkali metal cation selected from the group consisting of lithium, potassium, sodium, cesium and rubidium.

12. P-type zeolite according to claim 11 wherein the alkali metal is sodium or potassium.

* * * * *